United States Patent [19]

Dicke et al.

[11] Patent Number: 4,954,606
[45] Date of Patent: Sep. 4, 1990

[54] SOLID PHASE POST POLYMERIZATION CONDENSATION OF THERMOTROPIC POLYESTER IMIDES

[75] Inventors: Hans-Rudolf Dicke, Bestwig; Joachim Genz, Krefeld; Volker Eckhardt, Krefeld; Ludwig Bottenbruch, Krefeld, all of Fed. Rep. of Germany

[73] Assignee: Bayer Aktiengesellschaft, Leverkusen, Fed. Rep. of Germany

[21] Appl. No.: 259,768

[22] Filed: Oct. 19, 1988

[30] Foreign Application Priority Data

Oct. 31, 1987 [DE] Fed. Rep. of Germany ....... 3737067

[51] Int. Cl.$^5$ ............................................. C08G 73/16
[52] U.S. Cl. ................................. 528/170; 528/188; 528/480; 528/481
[58] Field of Search ................ 528/170, 188, 480, 481

[56] References Cited

U.S. PATENT DOCUMENTS 4,383,105  5/1983  Irwin .................................... 528/170
4,631,333 12/1986  Kricheldorf et al. ................ 528/170
4,760,124  7/1988  Matsumura et al. ................. 528/170

FOREIGN PATENT DOCUMENTS 0213609  3/1987  European Pat. Off. .

OTHER PUBLICATIONS

Patent Abstracts of Japan, Band 7, Nr. 155 (C-175)[1300], 4/1983; & JP-A-58 67 725 (Mitsui Toatsu Kagaku K.K.) 1983).

Primary Examiner—Harold D. Anderson
Attorney, Agent, or Firm—Connolly and Hutz

[57] ABSTRACT

Thermotropic polyester imides having recurrent units corresponding to the following formulae:

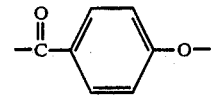

and

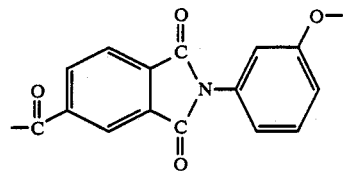

have excellent dimensional stability under heat and are suitable for the production of moulded articles, filaments, fibres and films.

1 Claim, No Drawings

SOLID PHASE POST POLYMERIZATION CONDENSATION OF THERMOTROPIC POLYESTER IMIDES

This invention relates to high molecular weight, thermotropic polyester imides which have excellent dimensional stability under heat, a process for their preparation and their use for the production of moulded articles, filaments, fibres and films.

Thermotropic substances are substances which form liquid crystalline melts. Thermotropic polycondensates are well known, see e.g.:

F. E. McFarlane et al., Liquid Crystal Polymers II, Contemporary Topics in Polymer Science, Vol. 2, Plenum Publishing Corporation, 1977;

W. J. Jackson and H. F. Kuhfuss, J. Polymer Science, Polymer Chem. Ed. 14, 2042 (1976);

W. C. Wooten et al. in A. Ciferri "Ultra-high Modulus Polymers", Applied Science Publ., London 1979, page 362 et seq.;

A. Blumstein et al., "Liquid Crystalline Order in Polymers", Academic Press 1978;

J. Preston, Angew. Makromol. Chem. 109/110, 1-19 (1982);

A. Ciferri, W. R. Krigbaum, R. B. Meyer, "Polymer Liquid Crystals", Academic Press, New York, 1982;

M. G. Dobb and J. E. McIntyre, Advances in Polym. Sci. 60/61, Springer-Verlag, Berlin 1984;

EP-A 1 185, 1 340, 8 855, 11 640, 15 856, 17 310, 18 145, 22 344, 44 204, 49 615, 131 846, 232 637, 134 956, 134 959, 141 320, 165 399, 170 935, 189 073;

US-3 991 013, 3 991 014, 4 066 620, 4 067 852, 4 083 829, 4 107 143;

WO 79/797, 79/1030, 79/1040.

The liquid crystalline state of polyester melts can be investigated by means of a polarisation microscope. For carrying out such investigations, the eye piece was equipped with an attachment containing a photoelectric diode arranged at the focal point of the eye piece. A measurement amplifier with control device connected down stream of the eye piece was used to adjust the measured values so that when the microscope was switched on with Nicols prisms arranged in parallel the value obtained in the absence of a sample of material was 100 scale divisions. The value obtained with crossed Nicols prisms was then 0.01 scale divisions. The thickness of the layer of polyester melts investigated was 100 μm.

The polyesters were investigated after melting the samples at temperatures from 140° to 400° C. If any increase in brightness was observed between the crossed Nicols prisms in this temperature range or in a part thereof, the polyester was classified as thermotropically liquid crystalline.

The liquid crystalline polycondensates give values above 1 scale division in the measuring arrangement, in most cases 3 to 90 scale divisions. For amorphous melts, e.g. aromatic polycarbonates, the values obtained were less than 0.1 scale divisions.

The method described above is particularly suitable for a rapid laboratory determination and gives unequivocal results in almost all cases. In cases of doubt, it may be advisable to confirm the presence of liquid crystalline components in the melt by X-ray angle scattering as described, for example, by G. W. Gray and P. A. Windsor in "Plastic Crystals, Physico-Chemical Properties and Methods of Investigation", in particular Chapter 3, John Wiley & Sons, New York, Sydney, Toronto, 1974.

Moulded articles produced from liquid crystalline melts of fully aromatic polycondensates have mechanical strength properties and rigidities such as are not normally found in unreinforced polycondensates produced from isotropic melts. The monomers used for the synthesis of thermotropic polycondensates are normally of the type which give rise to rigid rod-shaped macromolecules or macromolecular segments. Thus, for example, liquid crystalline polyesters obtained from p-hydroxybenzoic acid, hydroquinone and isophthalic acid (see e.g. DE-OS 2 025 971) and liquid crystalline polyester imides obtained from 2-hydroxy-6-naphthoic acid, chlorohydroquinone and 4-(4'-carboxyphthalimido)-benzoic acid (see e.g. EP 84 256) have been described. These products can be thermoplastically processed but they have the disadvantage that their glass temperature $T_g$ is relatively low and the maximum dimension stability obtainable under continued heating is therefore limited. The thermoplastically processible liquid crystalline polyesters and polyester imides hitherto described normally have glass temperatures below 180° C., in most cases even below 150° C.

It was an object of the present invention to provide liquid crystalline polycondensates with increased dimensional stabilities under heat which could be thermoplastically processed. The new thermotropic polycondensates should preferably have a liquid crystalline melt phase at a temperature below 380° C., preferably below 350° C.

The preferred new thermotropic polycondenstes should have a glass transition temperature above 200° C., preferably above 210° C.

It has now surprisingly been found that polyester imides containing condensed groups of p-hydroxybenzoic acid and of N-(3-hydroxyphenyl)-trimellitic acid imide have the desired combination of advantageous properties.

The invention relates to thermotropic polyester imides having recurrent units of the following formulae:

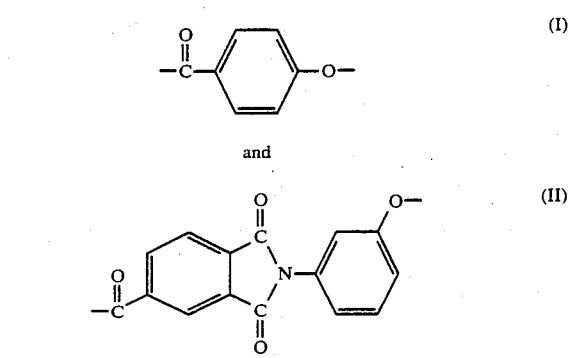

which polyester imides contain the condensed groups (I) in a quantity of from 60 to 80 mol%, preferably from 65 to 75 mol%, based on the sum of the condensed groups (I) and (II).

The unit (I) is derived from p-hydroxybenzoic acid or reactive derivatives thereof such as its aryl esters or acyl esters. The phenyl esters, tolyl esters, acetates and propionates are preferred reactive derivatives. The acetates are particularly preferred.

Unit (II) is derived from N-(3-hydroxyphenyl)-trimellitic acid imide or reactive derivatives thereof such as its aryl esters or acyl esters.

N-(3-hydroxyphenyl)-trimellitic acid imide may be prepared from m-aminophenol and trimellitic acid anhydride by methods known in the literature (see e.g. K. Kurita and S. Matsuda, Makromol. Chem., 184, 1223 (1983)).

The polyester imides according to the invention may contain the units of groups I and II in random distribution or in blocks. It should be noted, however, that an increase in the length of the blocks of these units causes a sharp increase in the fusion viscosity and the melting point of the resulting products.

The polyester imides according to the invention may contain, as end groups, COOH, H, OH, $OC_6H_5$ or acyloxy groups or groups derived from chain breaking agents. Preferred chain breaking agents include monofunctional aromatic hydroxyl compounds such as 4-hydroxydiphenyl, p-nonylphenol, 4-(1,1,3-3-tetramethylbutyl-phenol and β-naphthol and aromatic monocarboxylic acids such as diphenyl carboxylic acids and naphthalene carboxylic acids. Chain breaking agents may be used in quantities of about 0.1 to 10.0 mol%, preferably 0.2 to 5.0 mol%, based on the sum of groups I and II in the case of carboxylic acids and based on groups I and II in the case of phenols.

Trifunctional or higher functional monomers which have a branching action, preferably aromatic monomers of this type, may also be used in quantities of about 0.1 to 2.0 mol%, preferably 0.2 to 1.0 mol%, such as phloroglucinol, 1,3,5-benzene tricarboxylic acid and 3,5-dihydroxybenzoic acid.

The polyester imides according to the invention are insoluble in the solvents which were tested by us, such as p-chlorophenol or phenol/1,1,2,2-tetrachloroethane (1:1 ratio by weight).

The polyester imides according to the invention generally have a fusion viscosity of less than 1000 Pa.s, preferably from 10 to 500 Pa.s, determined at a shearing velocity of $10^3$ sec$^{-1}$, using a nozzle with a length-/diameter ratio of 20 at a temperature below 380° C., preferably below 350° C.

The polyester imides according to the invention may be prepared by various methods, e.g. by condensation or transesterification of the hydroxy carboxylic acids derived from groups I and II or the reactive derivatives thereof, followed by polycondensation (see e.g. R. W. Lenz, "Synthetic routes to liquid crystalline polymers" in: Recent Advances in Liquid Crystalline Polymers, Elsevier, New York 1985).

Examples of preferred starting compounds are their aryl esters and their acyl esters.

Examples of preferred methods of synthesis include the reaction of the lower acyl esters of the hydroxy carboxylic acids derived from the recurrent units (I) and (II), the acyl esters being optionally prepared in situ and the reaction of aryl esters of the hydroxy carboxylic acids derived from the recurrent units (I) and (II), the aryl esters being optionally prepared in situ.

In a particularly preferred method of synthesis, the lower acyl esters, preferably the acetates of the hydroxy carboxylic acids derived from groups (I) and (II) are reacted, the acyl esters being optionally prepared in situ.

According to another preferred method of synthesis, the hydroxy carboxylic acids derived from groups (II) are produced in situ by the reaction of trimellitic acid anhydride with 3-aminophenol and acetylated and then reacted with the lower acyl esters, preferably the acetates, of the hydroxy carboxylic acids derived from group (I) without being first isolated.

These reactions may be carried out in the solvent free, molten state or in the presence of a liquid heat transferring medium with a high boiling point (see e.g. DE-OS 2 025 971).

The groups I and II are incorporated in the polyester in the proportions of the starting components.

It may be advantageous to catalyse the condensation or transesterification reactions as well as the polycondensation reactions. Suitable catalysts for this purpose are known, e.g. Lewis acids and hydrohalic acids; oxides, hydrides, hydroxides, halides, alcoholates, phenolates, salts of inorganic or organic acids (preferably carboxylic acid salts), complex salts or mixed salts of alkaline earth metals such as magnesium or calcium; of sub-group elements such as vanadium, titanium, manganese, cobalt, nickel, zinc, lanthanum, cerium or zirconium or of elements from other groups of the periodic system, such as germanium, tin, lead or antimony or the alkali metals or alkaline earth metals as such, in particular sodium, or sodium hydroxide, lithium acetate, sodium acetate, potassium acetate, calcium acetate, magnesium acetate, cobalt acetate, zinc acetate, calcium benzoate, magnesium acetyl acetonate, zinc acetyl acetonate, vanadyl-$C_1$ to $C_8$-alkoxides titanium alkoxides such as titanium tetrabutylate, titanium tetrapropylate or alkoxy titanium silicates, zirconium butylate, zirconium propylate, titanium tetraphenolate, sodium phenolate, germanium dioxide, antimony trioxide, dialkyl and diaryl tin oxide, dibutyl tin diacetate or dibutyl dimethoxy tin.

The quantities of catalyst used are preferably about 0.001 to 1% by weight, in particular 0.01 to 0.2% by weight, based on the total weight of the monomers put into the process.

The polyester imides according to the invention may be prepared at temperatures of about 150° to 380° C., the reaction being generally started at a low temperature which is then continuously raised as the reaction progresses. A vacuum may be applied when the reaction velocity decreases, the pressure being preferably lowered continuously from normal pressure to about 0.1 mbar.

The product obtained may be subjected to a solid phase after-condensation in the form of a granulate or powder at reduced pressure and at temperatures from 150° to 300° C., preferably 200° to 250° C. After 1 to 25 hours, the molecular weight has increased and the properties of the polyester imide have thereby markedly improved.

The invention further relates to a process for the preparation of the new polyester imides, characterised in that the hydroxy carboxylic acids which are derived from groups II, and which may also be prepared in situ from trimellitic acid anhydride and 3-aminophenol, are reacted with the hydroxy carboxylic acids derived from groups I or reactive derivatives thereof, which may also be produced in situ, at temperatures from 150° to 380° C., optionally at reduced pressure and optionally in the presence of catalysts, chain breaking agents and branching agents.

Since the thermotropic polyester imides according to the invention have relatively low fusion viscosities, they may advantageously be processed from the melt for the production of injection moulded parts, filaments, fibres, bands and films, the shearing forces occurring in the process giving rise to a molecular orientation which is influenced to a large extent by the magnitude of the shearing forces. The polyester imides also show a marked structural viscosity, i.e. the fusion viscosity drops sharply with increasing shearing forces. The polyester imides may suitably be processed by injection moulding, extrusion, pultrusion, pressure moulding, thermo forming and melt spinning.

Moulded parts with high strength and rigidity and great toughness, especially at low temperatures, high elongation at break and high dimensional stability may be produced from the polyester imides according to the invention. Since the polyester imides are also highly chemically resistant and have good flame resistance, they are particularly suitable for the production of sheaths covering light wave guides electrical products such as insulators, conductor plates for printed circuits, electric plugs, sheaths for integrated circuits, and parts of mountings and fittings, parts of chemical engineering installations such as pipes, container linings, rotors, friction bearings, seals and filling bodies, and parts of apparatus used in medical technology and parts of air conditioning plants and valves.

The polyester imides according to the invention may also be used as coating and lining materials (pulverulent or dispersed). They are also eminently suitable for the production of reinforced and/or filled moulding compounds with a reinforcing and/or filler content of from 5 to 65% by weight, based on the reinforced and/or filled moulding compounds.

The invention also relates to the use of the new polyester imides for the production of moulded articles, filaments, fibres and films.

EXAMPLES

The investigation for thermotropic, liquid crystalline behaviour was carried out by the method already described. The glass transition temperature and the melting point were determined by differential thermo analysis (DTA) (apparatus used: Mettler TA 3000 System, heating rate 20 deg. cent./min).

EXAMPLE 1

The preparation of N-(3-hydroxyphenyl)-trimellitic acid imide is described in this example.

The following substances were weighed into a 6 liter three-necked flask equipped with KPG stirrer, reflux condenser, thermometer and nitrogen inlet:
190.75 g m-aminophenol
403.2 g trimellitic acid anhydride
3,150 g acetic acid.

The reaction mixture was heated to reflux in the course of 2 hours with stirring. After a further 4 hours under reflux, the reaction mixture was cooled and poured into 6 liters of glacial acetic acid. The precipitated product was suction filtered, washed with hot water and with hot isopropanol and then dried. A pale green, finely crystalline mass was obtained. The yield was 432.3 g ≙ 87.3% of the theoretical yield. The acid number was found to be 196 to 201 (theoretical: 198).

EXAMPLE 2

The preparation of N-(3-acetoxyphenyl)-trimellitic acid imide is described in this example.

191.85 g of the product from Example 1, 76.1 g of acetic anhydride and 270 l of glacial acetic acid were introduced into an apparatus consisting of a 1 liter three necked flask, KPG stirrer, thermometer and distillation attachment. After the addition of two drops of concentrated sulphuric acid, the reaction mixture was heated to reflx and kept under reflux for 2 hours, and about three-quarters of the acetic acid was then distilled off. The product was suction filtered while hot, suspended in acetone, filtered and washed several times with acetone. After drying at 60° to 70° C., 170.5 g ≙ 77.4% of the theoretical amount were isolated.

EXAMPLE 3

Preparation of a polyester imide according to the invention from p-acetoxybenzoic acid and N-(3-acetoxyphenyl)-trimellitic acid.

The following substances were weighed into a 1 liter three-necked flask equipped with stirrer, distillation attachment and nitrogen inlet:
227.71 g ≙ 0.7 mol N-(3-acetoxyphenyl)-trimellitic acid
382.49 g ≙ 2.1 mol p-acetoxybenzoic acid
0.044 g of magnesium.

After repeated evacuation and flushing with nitrogen, the apparatus was heated to 230° C. in the course of 1 hour. The temperature was then raised stepwise to 330° C. in the course of a further 4 hours. A vacuum was then applied at this temperature and the pressure was continuously reduced to 1.3 mbar. After 20 minutes at this vacuum, the heating bath was removed and after cooling, the flask was broken to isolate the product. A pale beige, fibrous polyester imide was obtained. This product was insoluble in all solvents investigated, e.g. p-chlorophenol or phenol/1,1,2,2-tetrachloroethane (ratio by weight 1:1).

An anisotropic melt phase was observed above 310° C. to over 400° C. under the polarisation microscope. The glass transition temperature of this polymer was 215.3° C. (first heating up) and 218.7° C. (second heating up).

EXAMPLES 4 TO 6

Other thermotropic polyester imides were prepared in the apparatus described in Example 3 by the method described in that Example. The compositions of the products and the results of DSC and polarisation microscopic investigations are shown in Table 1.

TABLE 1

| Example | pHB (mol %) | N-ATS | $T_g$ (°C.) | Anisotropic melt |
|---|---|---|---|---|
| 4 | 70 | 30 | 214.1 | 290° C. to >400° C. |
| 5 | 65 | 35 | 206.8 | 290° C. to >400° C. |
| 6 | 60 | 40 | 213.5 | 280° C. to >400° C. |

We claim:

1. A process for preparing polyester imides comprising the solid phase after-condensation of polyester imides prepared by reacting a compound of the formula,

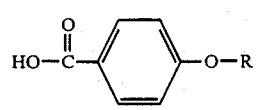
(A)

with a compound of the formula,

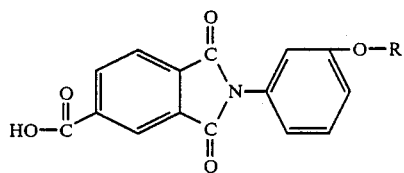
wherein R is hydrogen,
(B)
$$-\overset{\overset{\displaystyle O}{\|}}{C}-C_nH_{2n+1}$$
or —Ar, n=1 or 3 and Ar is phenyl or tolyl, optionally in the presence of catalysts, chain breaking agents, branching agents, or mixtures thereof at temperatures from 150° to 380° C., optionally at reduced pressure.
* * * * *